(12) United States Patent
Hsieh (10) Patent No.: US 11,899,353 B2
(45) Date of Patent: Feb. 13, 2024

(54) ILLUMINATION SYSTEM AND PROJECTION APPARATUS

(71) Applicant: Coretronic Corporation, Hsin-Chu (TW)

(72) Inventor: Wan-Ting Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 21 days.

(21) Appl. No.: 17/697,955

(22) Filed: Mar. 18, 2022

(65) Prior Publication Data

US 2022/0308435 A1    Sep. 29, 2022

(30) Foreign Application Priority Data

Mar. 23, 2021  (CN) .......................... 202120587060.3

(51) Int. Cl.
G03B 21/20       (2006.01)
G02B 27/10       (2006.01)
G03B 21/14       (2006.01)

(52) U.S. Cl.
CPC ..... G03B 21/2066 (2013.01); G02B 27/1006 (2013.01); G03B 21/142 (2013.01); G03B 21/206 (2013.01); G03B 21/2033 (2013.01)

(58) Field of Classification Search
CPC .... G03B 21/00–64; G02B 27/01–0189; G02B 26/008; G02B 27/00–648
See application file for complete search history.

(56) References Cited

U.S. PATENT DOCUMENTS

2012/0218529 A1*  8/2012  Huang ................... G03B 33/12
                                                353/102
2018/0299757 A1* 10/2018  Liao ...................... G03B 21/204
2019/0391471 A1* 12/2019  Weng ................... G02B 26/008

FOREIGN PATENT DOCUMENTS

CN        110632818      12/2019
TW          I658292       5/2019

* cited by examiner

*Primary Examiner* — Bao-Luan Q Le
*Assistant Examiner* — Christopher A Lamb, II
(74) *Attorney, Agent, or Firm* — JCIPRNET (57) ABSTRACT

An illumination system comprises an exciting light source, a phosphor wheel, a first lens, a first reflector, and a light uniforming element. The exciting light source emits an excitation beam. In a first time sequence, the phosphor wheel reflects the excitation beam to the first reflector, the first reflector reflects the excitation beam to the first lens and the excitation beam passes through the first lens and transmits to the light uniforming element. In a second time sequence, the phosphor wheel converts the excitation beam to a conversion beam, the conversion beam from the phosphor wheel passes through the first lens and transmits to the first reflector, the first reflector reflects the conversion beam to the first lens, the conversion beam passes through the first lens and transmits to the light uniforming element, the excitation beam and the conversion beam, sequentially and respectively transmits to the light uniforming element.

24 Claims, 9 Drawing Sheets

ILLUMINATION SYSTEM AND PROJECTION APPARATUS

CROSS-REFERENCE TO RELATED APPLICATION

This application claims the priority benefit of China application serial no. 202120587060.3, filed on Mar. 23, 2021. The entirety of the above-mentioned patent application is hereby incorporated by reference herein and made a part of this specification.

BACKGROUND

Technical Field

The disclosure relates to an optical system and an optical apparatus, and particularly relates to an illumination system and a projection apparatus.

Description of Related Art

In the structure of the laser projector of the known technology, the light generated by the light source module is filtered out the color light of the time sequence through the color filter wheel. After these color lights pass through the light uniforming element to homogenize the light, the gray scale of the image is controlled by the light valve, and then the image is projected through the projection lens. In the structure of the light source module, the blue laser array is focused on the rotating phosphor wheel through the optical element. The phosphor of the phosphor wheel will excite yellow light when the blue light hits the phosphor of the phosphor wheel, and the yellow light will be focused into the light uniforming element after being reflected. When the blue light hits the non-optical active region of the phosphor wheel, the blue light will pass through the non-optical active region and then focus into the light uniforming element by the optical element.

However, in any one of the optical element in the optical path structure, the blue light and the yellow light pass almost only once. That is to say, there are too many optical elements in the optical path structure, which result in large accumulated tolerance of the structure, as well as difficulty in assembly and poor accuracy. In addition, too many optical elements also make the volume of the system difficult to be reduced.

The information disclosed in this "BACKGROUND OF THE DISCLOSURE" section is only for enhancement of understanding of the background of the described technology and therefore it may contain information that does not form the prior art that is already known to a person of ordinary skill in the art. Further, the information disclosed in this "BACKGROUND OF THE DISCLOSURE" section does not mean that one or more problems to be resolved by one or more embodiments of the disclosure was acknowledged by a person of ordinary skill in the art.

SUMMARY

The disclosure provides an illumination system and a projection apparatus, which simplifies a structure of an optical path and reduces accumulated tolerance of the structure, thereby facilitating assembly of the system, improving accuracy of assembly, and further reducing volume.

The disclosure provides an illumination system for providing an illumination beam, which includes an exciting light source, a phosphor wheel, a first lens, a first reflector, and a light uniforming element. The exciting light source is configured to emit an excitation beam. The excitation beam passes through the first lens and then is transmitted to the phosphor wheel. In a first time sequence, the phosphor wheel is configured to reflect the excitation beam to the first reflector, the first reflector reflects the excitation beam to the first lens and the excitation beam passes through the first lens and then transmits to the light uniforming element. And in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element.

Wherein the excitation beam from the phosphor wheel and the conversion beam from the phosphor wheel, in the first time sequence and in the second time sequence, are respectively transmitted to the light uniforming element to generate the illumination beam.

The disclosure provides a projection apparatus, which includes the abovementioned illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam to project the image beam out of the projection apparatus.

Based on the above, in an embodiment of the disclosure, since the excitation beam of the illumination system or the projection apparatus passes through the first lens three times and then is transmitted to the light uniforming element in the first time sequence, and the conversion beam sequentially passes through the first lens twice and then is transmitted to the light uniforming element in the second time sequence, the overall optical path of the illumination system is relatively simple, and the accumulated tolerance of the structure is reduced, thereby facilitating the assembly of the system, improving the accuracy of assembly, and further reducing the volume.

Other objectives, features and advantages of the disclosure will be further understood from the further technological features disclosed by the embodiments of the disclosure wherein there are shown and described preferred of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "Coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1A:
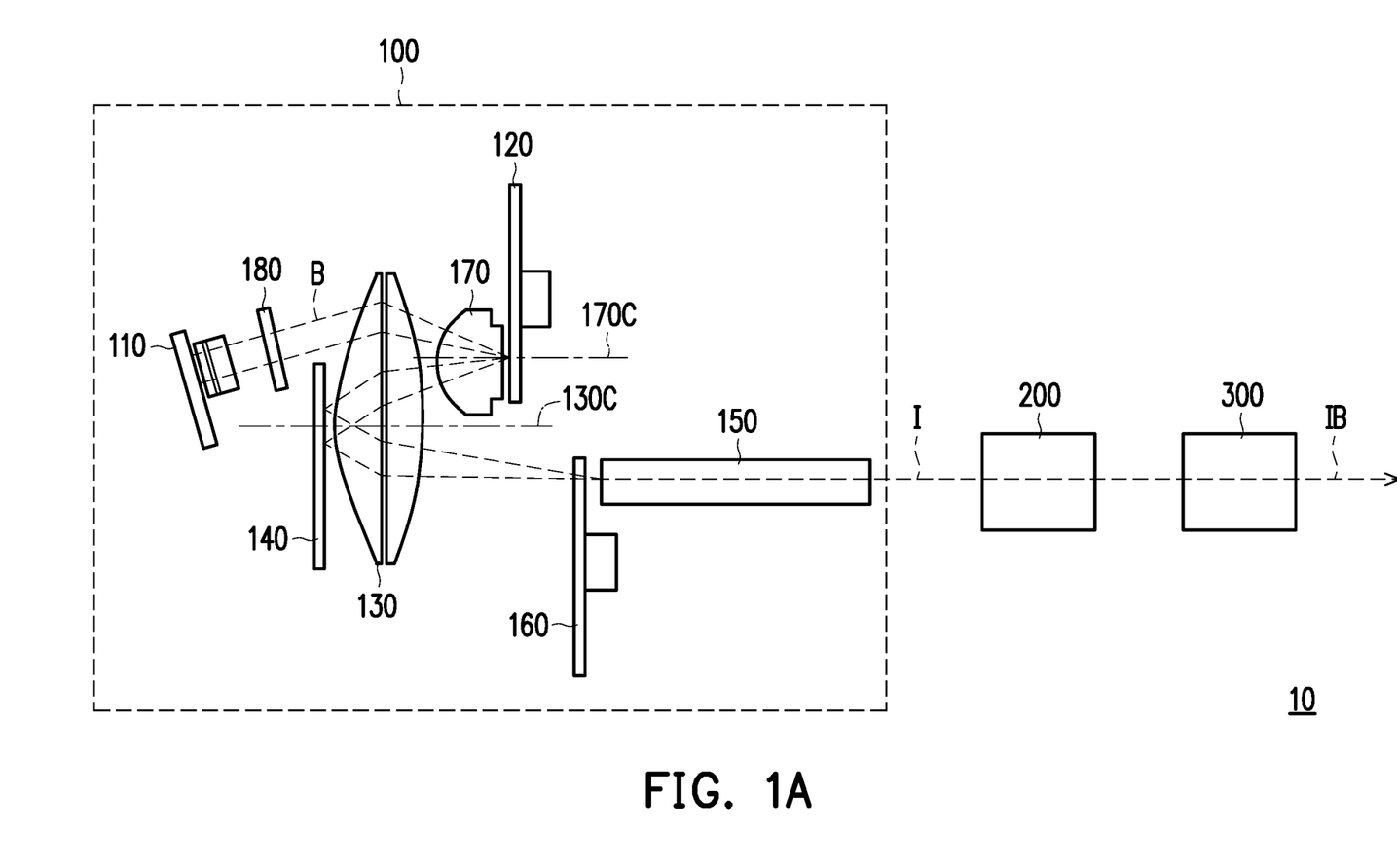
FIG. 1A is a schematic diagram of an illumination system and a projection apparatus according to a first embodiment of the disclosure in a first time sequence.

FIG. 1A is a schematic diagram of an illumination system and a projection apparatus according to a first embodiment of the disclosure in a first time sequence. Referring to FIG. 1A, a projection apparatus 10 of the disclosure includes an illumination system 100, a light valve 200, and a projection lens 300. The illumination system 100 is configured to provide an illumination beam I. The light valve 200 is disposed on a transmission path of the illumination beam I, and is configured to convert the illumination beam I into an image beam IB. The projection lens 300 is disposed on a transmission path of the image beam IB, and is configured to project the image beam IB out of the projection apparatus.

In detail, the light valve 200 according to this embodiment is, for example, a spatial light modulator such as a digital micro-mirror device (DMD), a liquid-crystal-on-silicon panel (LCOS Panel), or a liquid crystal panel (LCD), etc. In addition, the projection lens 300 includes, for example, a combination of one or more optical lenses with refractive power. The optical lenses includes, for example, a non-planar lenses such as a biconcave lenses, a biconvex lenses, a concave-convex lens, a convex-concave lenses, a plano-convex lenses, a plano-concave lenses, etc., or various combinations thereof. The form and the type of the projection lens 300 are not particularly limited in the disclosure.

In this embodiment, the illumination system 100 includes an exciting light source 110, a phosphor wheel 120, a first lens 130, a first reflector 140, and a light uniforming element 150. The light uniforming element 150 is, for example, an integration rod, a lens array, or other optical elements with a light homogenization effect, but the disclosure is not limited thereto.

In this embodiment, the exciting light source 110 is configured to emit an excitation beam B. The exciting light source 110 is, for example, a laser diode (LD) or other suitable light source, and the excitation beam B is, for example, a blue beam or a beam of other suitable color light. In addition, the first reflector 140 may be a total reflector or a white reflect sheet. When the first reflector 140 is the complete reflector, light energy utilization efficiency of the illumination system 100 is relatively good. When the first reflector 140 is the white reflector, since the white reflector is a reflector with a diffusion effect, homogeneity of the illumination beam I generated by the illumination system 100 is relatively good.

Figure 1B:
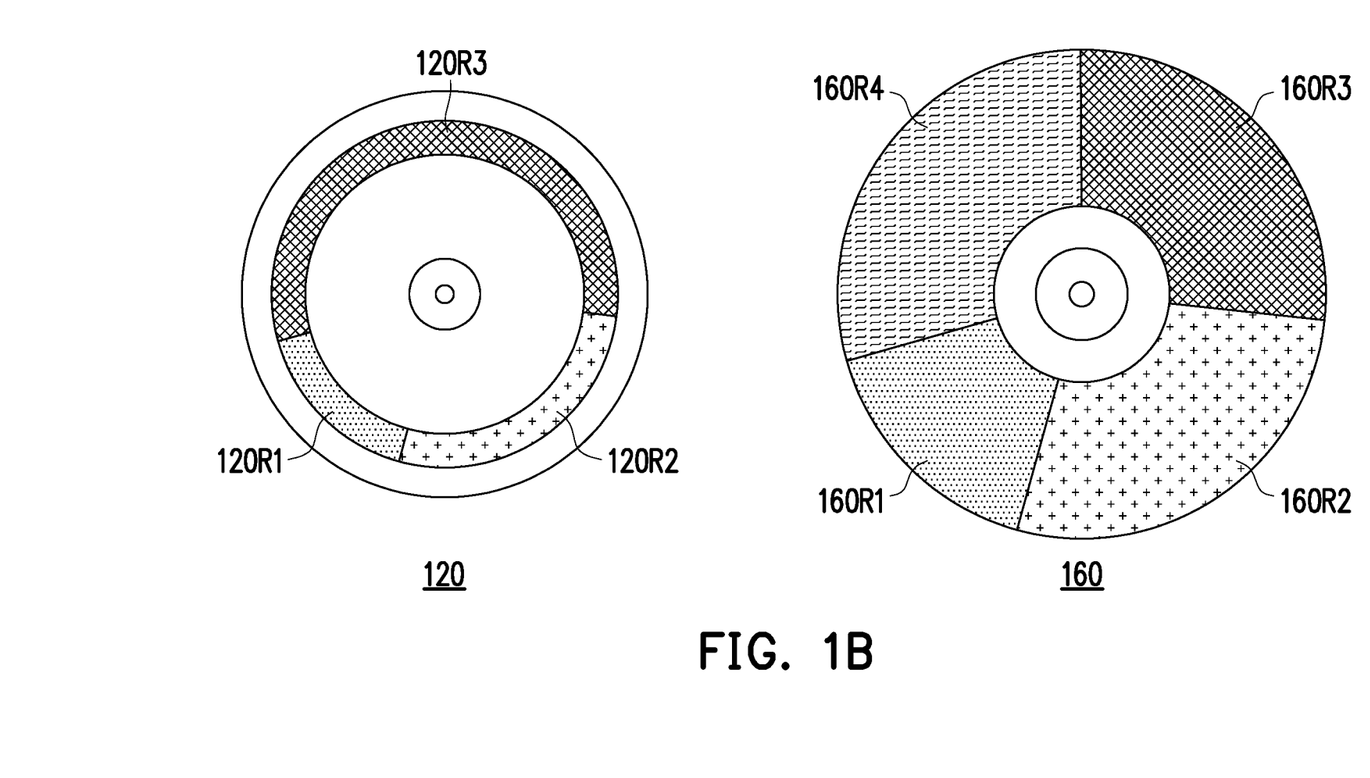
FIG. 1B is a schematic diagram of a phosphor wheel and a color filter wheel of FIG. 1A.
Figure 1C:
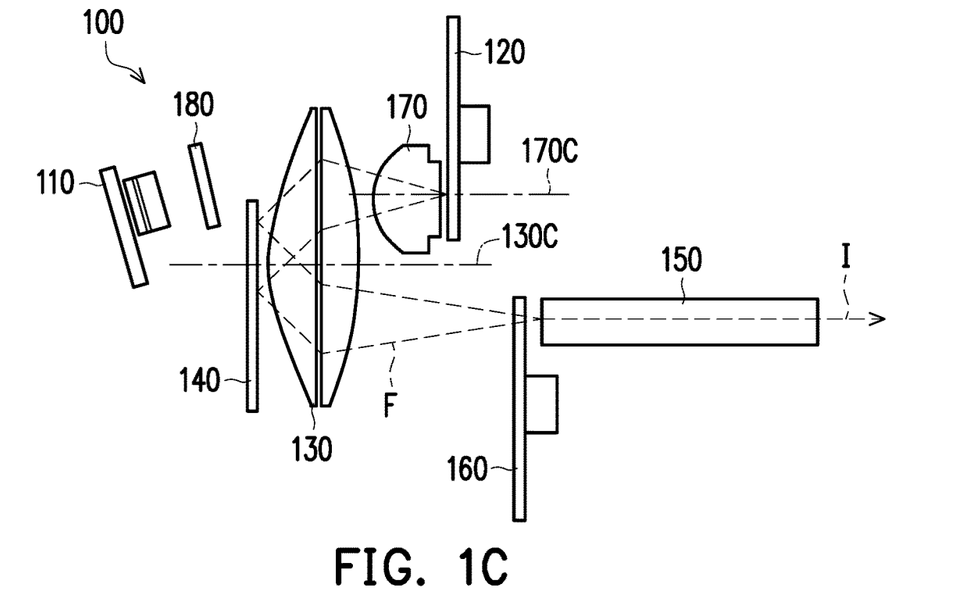
FIG. 1C is a schematic diagram of the illumination system according to the first embodiment of the disclosure in a second time sequence.

FIG. 1B is a schematic diagram of the phosphor wheel and a color filter wheel of FIG. 1A. FIG. 1C is a schematic diagram of the illumination system according to the first embodiment of the disclosure in a second time sequence. For the convenience of description, FIG. 1C only shows the illumination system 100 and omits to show the light valve 200 and the projection lens 300. Referring to FIG. 1A, FIG. 1B and FIG. 1C at the same time, in this embodiment, the phosphor wheel 120 includes a first region 120R1, a second region 120R2, and a third region 120R3. The first region 120R1 may be a reflecting region. In addition, the second region 120R2 and the third region 120R3 are phosphor regions for converting the excited beam B into a conversion beam F. For example, the second region 120R2 converts a blue light into a green light, and the third region 120R3 converts the blue light into a yellow light, but the disclosure is not limited thereto.

In this embodiment, the excitation beam B passes through a peripheral region of the first lens 130 and then is transmitted to the phosphor wheel 120. Furthermore, in the first time sequence, the first region 120R1 cuts into a transmission path of the excitation beam B. In the second time sequence, the second region 120R2 or the third region 120R3 cut into the transmission path of the excitation beam B.

In the first time sequence of this embodiment, the excitation beam B is transmitted to the first reflector 140 by reflection of the first region 120R1 of the phosphor wheel 120. In the second time sequence, the excitation beam B is converted to the conversion beam F by the second region 120R2 or the third region 120R3 of the phosphor wheel 120. The excitation beam B and the conversion beam F from the phosphor wheel 120 pass through the first lens 130 and then are transmitted to the first reflector 140. The first reflector 140 then reflects the excitation beam B and the conversion beam F to the first lens 130. Next, the excitation beam B and the conversion beam F pass through the first lens 130 and then are transmitted to the light uniforming element 150 to generate the illumination beam I, so that the illumination system 100 respectively outputs a first color light and a second color light of the illumination beam I.

In this embodiment, the illumination system 100 further includes a color filter wheel 160 disposed between the first lens 130 and the light uniforming element 150, as shown in FIG. 1A. The color filter wheel 160 includes a first filter region 160R1, a second filter region 160R2, a third filter region 160R3, and a fourth filter region 160R4, as shown in FIG. 1B. The first filter region 160R1 may be a blue light filter region, the second filter region 160R2 may be a green light filter region, the third filter region 160R3 may be a yellow light filter region, and the fourth filter region 160R4 may be a red light filter region. In the first time sequence, the first filter region 160R1 cuts into the transmission path of the excitation beam B. In the second time sequence, the second filter region 160R2, the third filter region 160R3 or the fourth filter region 160R4 cut into a transmission path of the conversion beam F.

In this embodiment, the excitation beam B and the conversion beam F passing through the first lens 130 pass through the color filter wheel 160 and then are transmitted to the light uniforming element 150. That is to say, a light color of the first color light is the same as the light color of the excitation beam B, and the second color light may include three kinds of color lights different from the light color of the excitation beam B.

In this embodiment, the first reflector 140 is parallel to the phosphor wheel 120, the first reflector 140 and the first lens 130 are parallel to each other, an optical axis 130C of the first lens 130 is perpendicular to a reflecting surface of the first reflector 140, and the first reflector 140 is parallel to the color filter wheel 160.

In this embodiment, the illumination system 100 further includes a second lens 170 disposed between the first lens 130 and the phosphor wheel 120. The excitation beam B from the exciting light source 110 sequentially passes through the first lens 130, passes through the second lens 170, and is transmitted to the phosphor wheel 120 after being contracted by the second lens 170. The excitation beam B and the conversion beam F reflected by the phosphor wheel 120 pass through the second lens 170 and then are transmitted to the first lens 130.

In this embodiment, the optical axis 130C of the first lens 130 and the optical axis 170C of the second lens 170 are parallel to each other.

In this embodiment, the illumination system 100 further includes an optical element set 180. The optical element set 180 is configured to collimate or contract the excitation beam B emitted by the exciting light source 110. The optical element set 180 may be a combination of one or more optical lenses with refractive power or may be a lens array, but the disclosure is not limited thereto.

Based on the above, in an embodiment of the disclosure, an optical path of the illumination system 100 or the projection apparatus 10 is designed as the following. The excitation beam B passes through the first lens 130 three times and then is transmitted to the light uniforming element 150, the conversion beam F passes through the first lens 130 twice and then is transmitted to the light uniforming element 150, and the excitation beam B and the conversion beam F share a common optical path after leaving the phosphor wheel 120. Therefore, the overall optical path of the illumination system 100 is relatively simple. Moreover, since the optical path of the illumination system 100 is simplified and an accumulated tolerance of structure is reduced, assembly of the system is facilitated, accuracy of assembly is improved, and volume may be further reduced.

Figure 2:
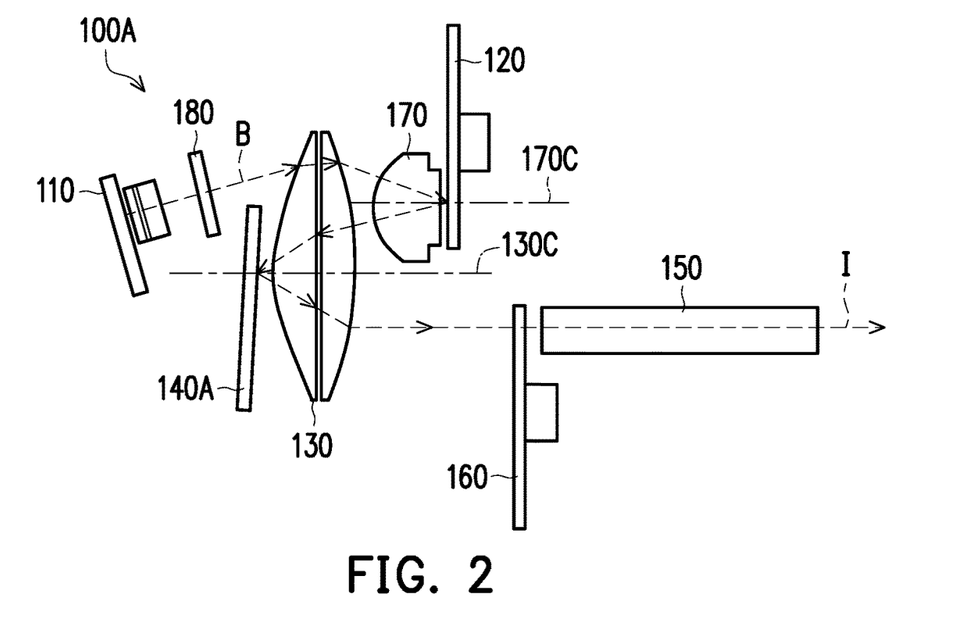
FIG. 2 is a schematic diagram of an illumination system according to a second embodiment of the disclosure.

FIG. 2 is a schematic diagram of an illumination system according to a second embodiment of the disclosure. Referring to FIG. 2, an illumination system 100A according to this embodiment is similar to the illumination system 100 of FIG. 1A. The main difference is that the first reflector 140A of the illumination system 100A and the phosphor wheel 120 are not parallel to each other. In this way, without interfering with the operation of the optical path, the first reflector 140A and the phosphor wheel 120 are designed not to be parallel to each other by reducing the first lens 130 and avoiding interference of the first reflector 140A to make arrangement of the elements in the illumination system 100A more compact, and the system volume of the illumination system 100A reduced.

Figure 3:
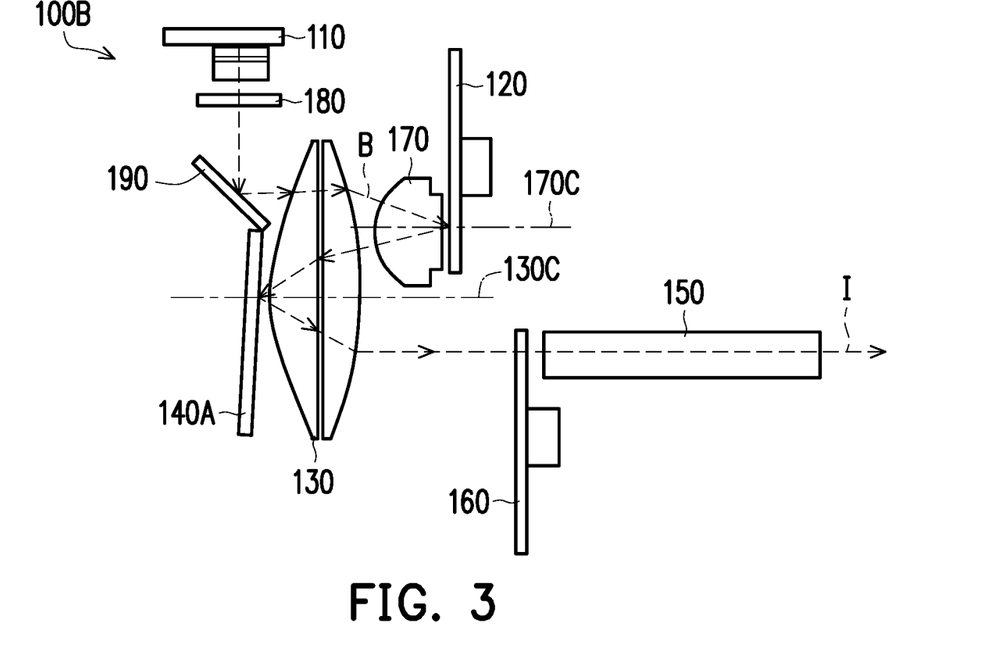
FIG. 3 is a schematic diagram of an illumination system according to a third embodiment of the disclosure.

FIG. 3 is a schematic diagram of an illumination system according to a third embodiment of the disclosure. Referring to FIG. 3, an illumination system 100B according to this embodiment is similar to the illumination system 100A of FIG. 2. The main difference is that the illumination system 100B further includes a second reflector 190. Similar to the first reflector 140A, the second reflector 190 may be a total reflector or a white reflect sheet. The second reflector 190 is disposed on the transmission path of the excitation beam B. The excitation beam B from the exciting light source 110 is reflected to the first lens 130 by the second reflector 190.

Based on the above, in the illumination system 100B of the third embodiment of the disclosure, the optical path of the excitation beam B is adjusted by disposing the second reflector 190, which is beneficial to effectively use space in a longitudinal direction of the illumination system 100B (that is, perpendicular to a direction from the first reflector 140A to the first lens 130), thereby reducing the volume in a lateral direction of the illumination system 100B.

Figure 4:
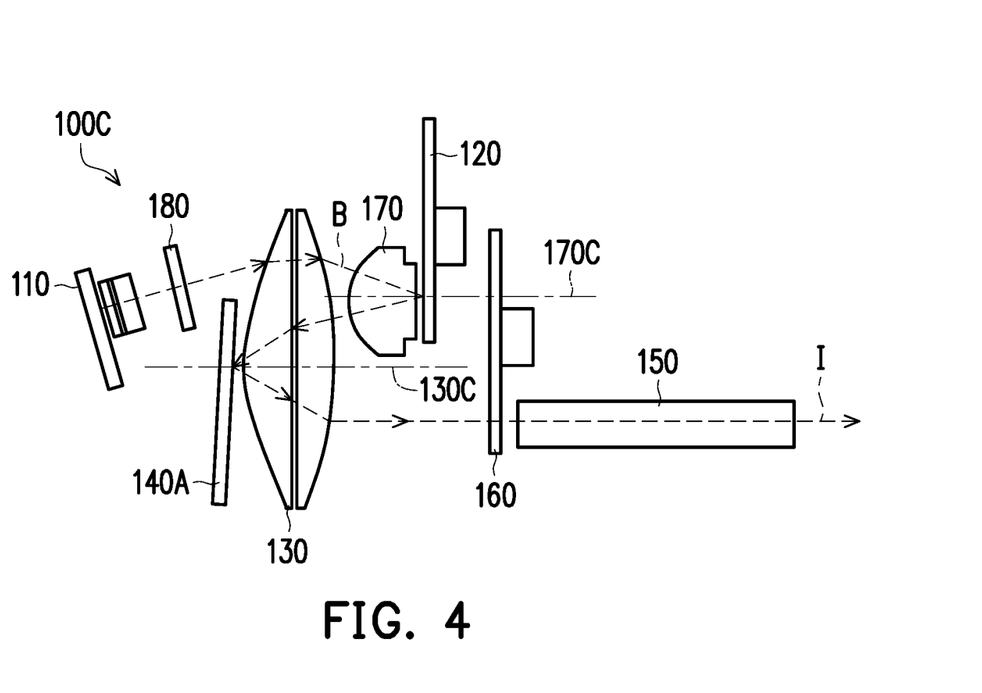
FIG. 4 is a schematic diagram of an illumination system according to a fourth embodiment of the disclosure.

FIG. 4 is a schematic diagram of an illumination system according to a fourth embodiment of the disclosure. Referring to FIG. 4, an illumination system 100C according to this embodiment is similar to the illumination system 100A of FIG. 2. The main difference is that in the illumination system 100C, along a direction of the optical axis 130C of the first lens 130, the phosphor wheel 120 and the color filter wheel 160 partially overlap. Therefore, the volume of the illumination system 100C in the longitudinal direction is reduced.

Figure 5A:
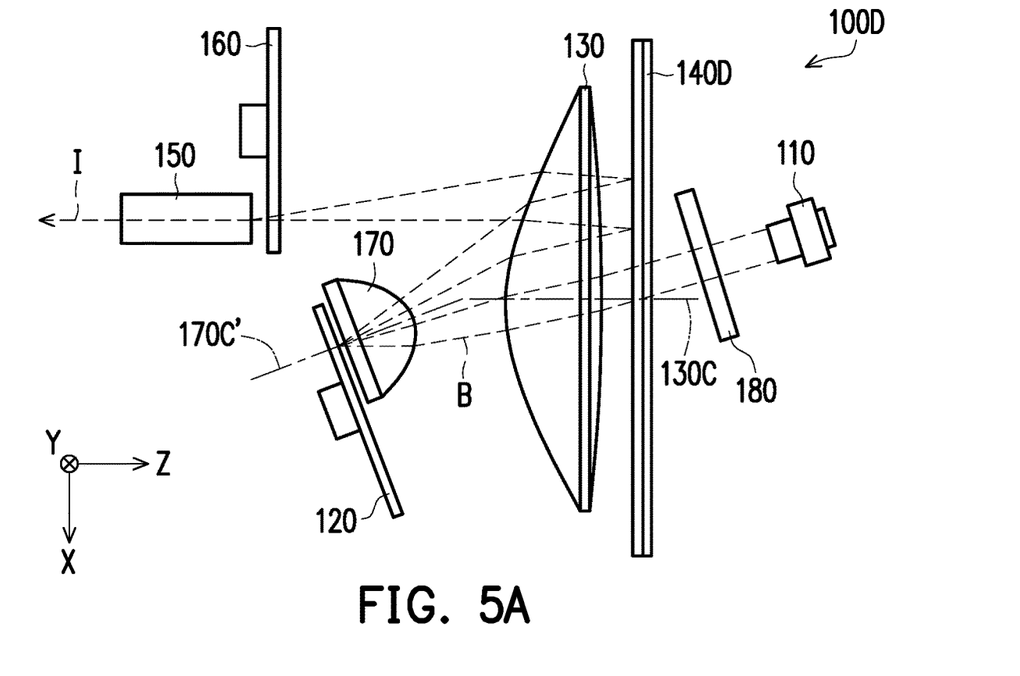
FIG. 5A is a schematic diagram of an illumination system according to a fifth embodiment of the disclosure in the first time sequence.
Figure 5B:
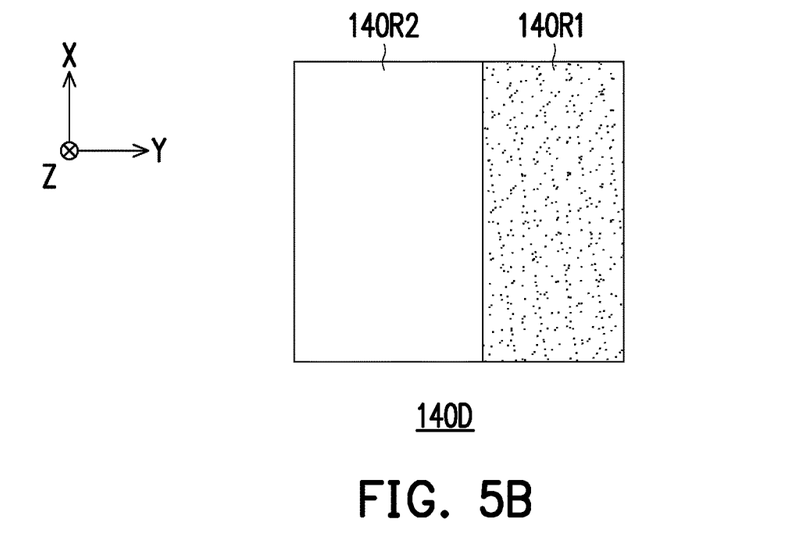
FIG. 5B is a schematic diagram of a first reflector of FIG. 5A.
Figure 5C:
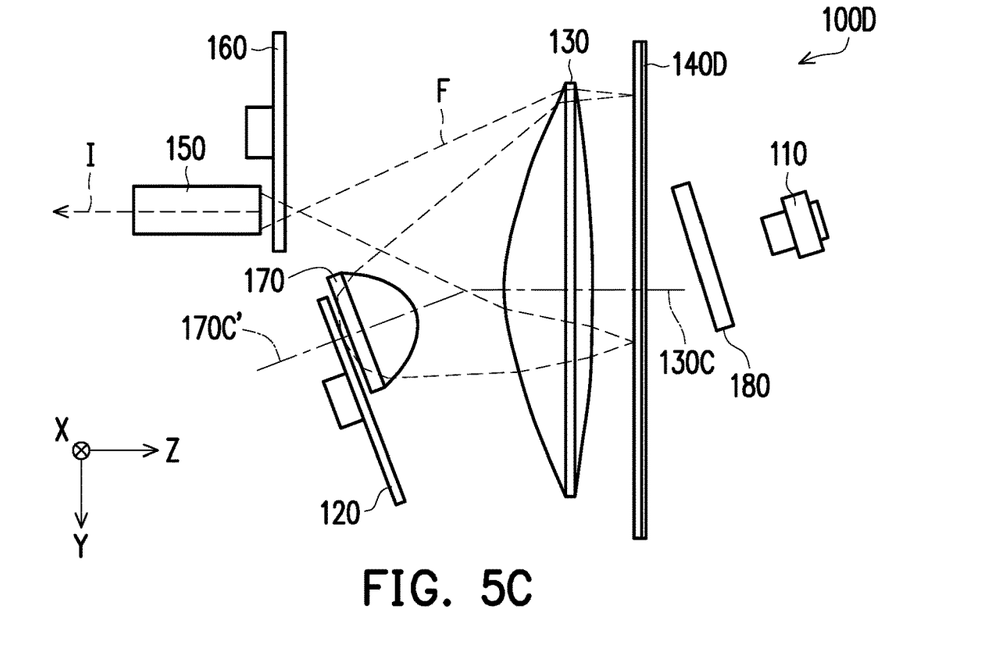
FIG. 5C is a schematic diagram of the illumination system according to the fifth embodiment of the disclosure in the second time sequence.

FIG. 5A is a schematic diagram of an illumination system according to a fifth embodiment of the disclosure in the first time sequence. FIG. 5B is a schematic diagram of a first reflector of FIG. 5A. FIG. 5C is a schematic diagram of the illumination system according to the fifth embodiment of the disclosure in the second time sequence. Referring to FIG.

5A, FIG. 5B and FIG. 5C, an illumination system 100D according to this embodiment is similar to the illumination system 100A of FIG. 2. The main difference is that the first reflector 140D of the illumination system 100D includes a light splitting region 140R1 and a reflecting region 140R2. As shown in FIG. 5A and FIG. 5B, the first reflector 140D is disposed along a XY-plane. In this embodiment, the light splitting region 140R1 allows light with same wavelength as the excitation beam B to pass through, and reflects light with remaining wavelengths, such as conversion beam F. In addition, the excitation beam B from the exciting light source 110 passes through the light splitting region 140R1 and then is transmitted to the first lens 130. In the first time sequence, the excitation beam B from the phosphor wheel 120 and passing through the first lens 130 is reflected to the first lens 130 by the reflecting region 140R2. In the second time sequence, the conversion beam F from the phosphor wheel 120 and passing through the first lens 130 is reflected to the first lens 130 by the light splitting region 140R1 or the reflecting region 140R2.

In this embodiment, the first reflector 140D and the first lens 130 are parallel to each other, the optical axis 130C of the first lens 130 and an optical axis 170C' of the second lens 170 are not parallel to each other, and the color filter wheel 160 and the phosphor wheel 120 are not parallel to each other.

Based on the above, since the first reflector 140D of the illumination system 100D according to this embodiment includes the light splitting region 140R1 and the reflecting region 140R2, in the optical path of the excitation beam B from the exciting light source 110 to the phosphor wheel 120, the excitation beam B may be designed to pass through the first lens 130 at close to the optical axis 130C. Therefore, the illumination system 100D may use the smaller first lens 130 to further reduce the system volume of the illumination system 100D.

Figure 6:
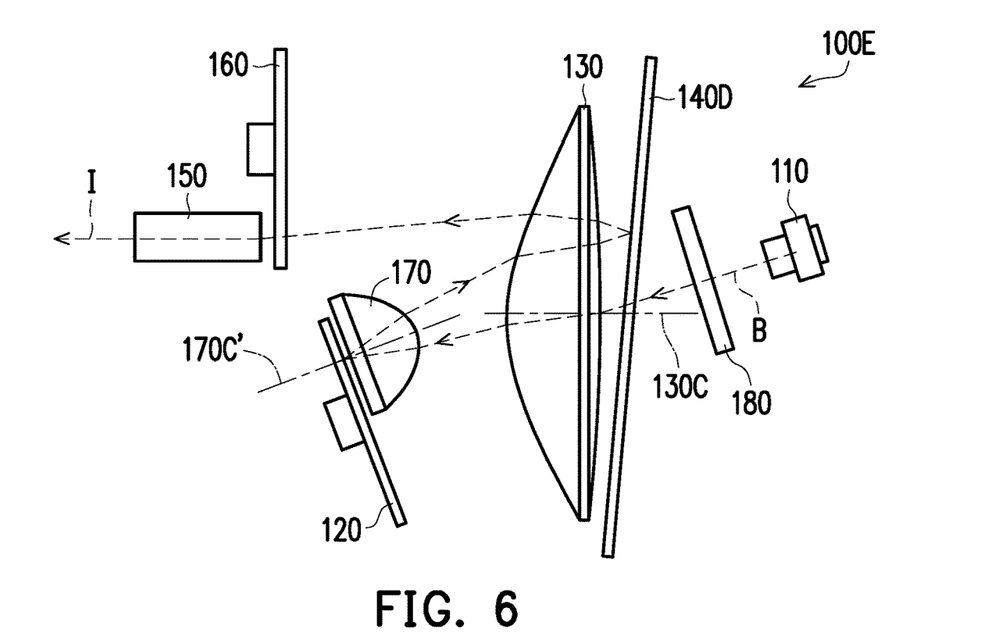
FIG. 6 is a schematic diagram of an illumination system according to a sixth embodiment of the disclosure.

FIG. 6 is a schematic diagram of an illumination system according to a sixth embodiment of the disclosure. Referring to FIG. 6, an illumination system 100E according to this embodiment is similar to the illumination system 100D of FIG. 5A. The main difference is that the first reflector 140D and the first lens 130 of the illumination system 100E are not parallel to each other. In this way, without interfering with the operation of the optical path, the first reflector 140A and the phosphor wheel 120 are designed not to be parallel to each other by reducing the first lens 130 and avoiding interference of the phosphor wheel 120 and the color filter wheel 160 to make arrangement of the elements in the illumination system 100E more compact, and the system volume of the illumination system 100E reduced. In addition, the advantages of the illumination system 100E according to this embodiment are similar to the illumination system 100D of FIG. 5A, which will not be repetitively described in the following.

Figure 7A:
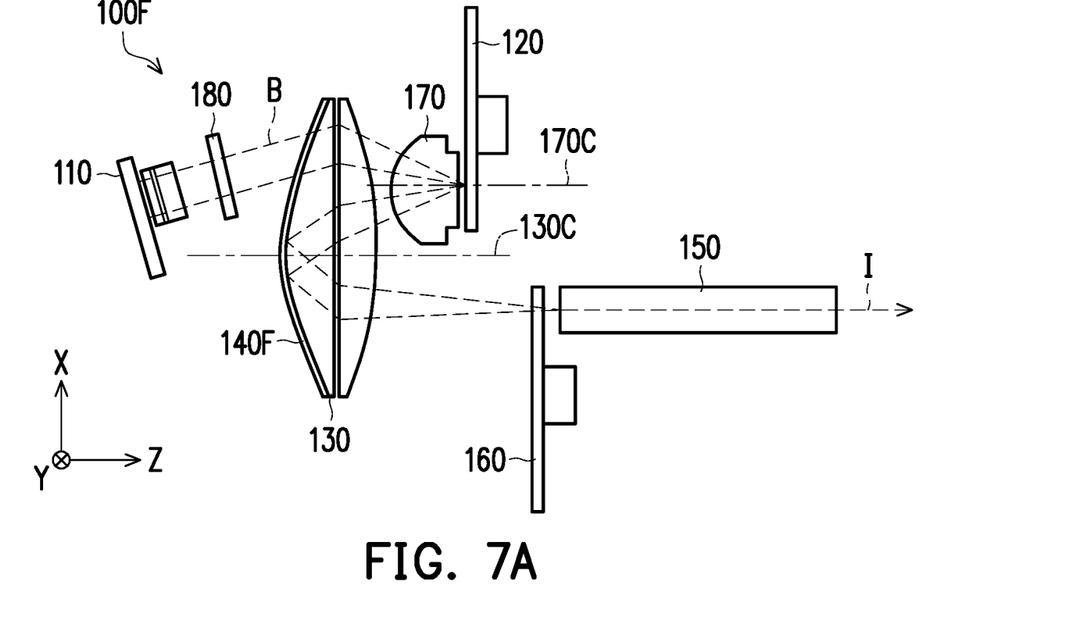
FIG. 7A is a schematic diagram of an illumination system according to a seventh embodiment of the disclosure in the first time sequence.
Figure 7B:
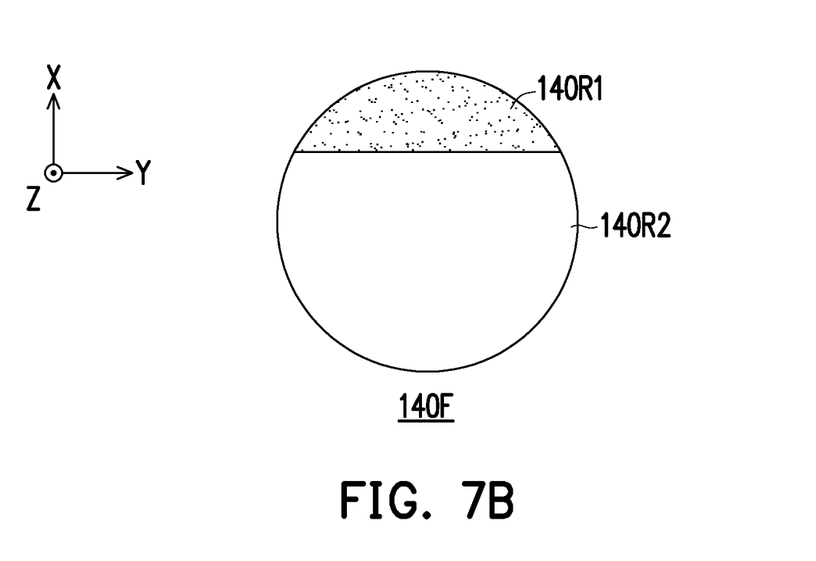
FIG. 7B is a schematic diagram of a first reflector of FIG. 7A.
Figure 7C:
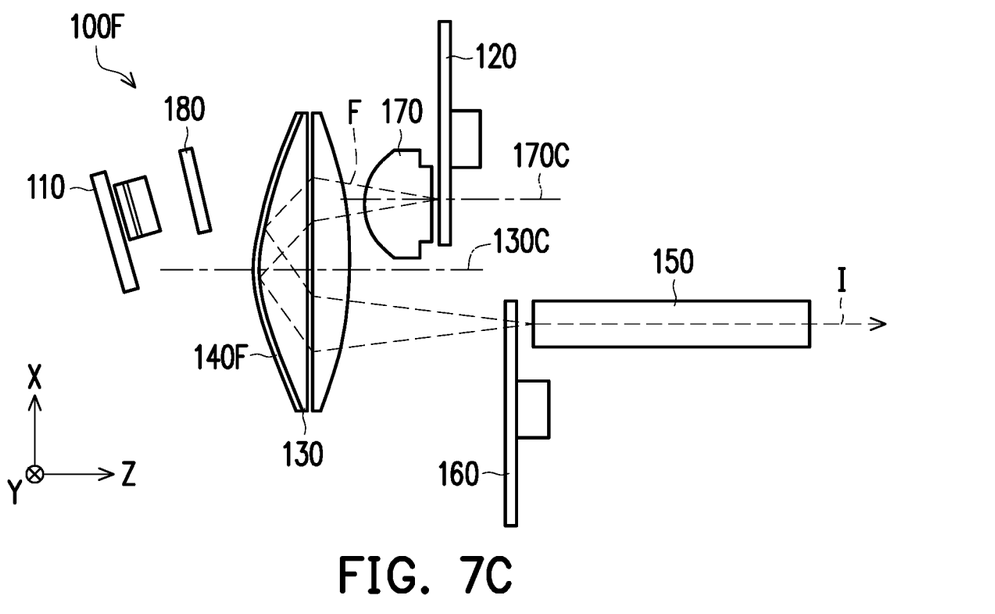
FIG. 7C is a schematic diagram of the illumination system according to the seventh embodiment of the disclosure in the second time sequence.

FIG. 7A is a schematic diagram of an illumination system according to a seventh embodiment of the disclosure in the first time sequence. FIG. 7B is a schematic diagram of a first reflector of FIG. 7A. FIG. 7C is a schematic diagram of the illumination system according to the seventh embodiment of the disclosure in the second time sequence. Referring to FIG. 7A to FIG. 7C, an illumination system 100F according to this embodiment is similar to the illumination system 100 of FIG. 1A. The main difference is that a first reflector 140F is an optical film disposed on a surface of the first lens 130 away from the phosphor wheel 120. As shown in FIG. 7A and FIG. 7B, the first reflector 140F is disposed along a XY-plane. In addition, similar to the first reflector 140D in FIG. 5A and FIG. 5B, the first reflector 140F includes the light splitting region 140R1 and the reflecting region 140R2. A transmission way of excitation beam B and conversion beam F by the first reflector 140F is also similar to the transmission way of excitation beam B and conversion beam F by the first reflector 140D in FIG. 5A.

In another embodiment, the first reflector 140F further includes an anti-reflection film directly disposed on the light splitting region 140R1, so that the light energy utilization efficiency of the illumination system 100F is relatively high.

In this embodiment, the optical axis 130C of the first lens 130 and the optical axis 170C of the second lens 170 are parallel to each other, and the color filter wheel 160 and the phosphor wheel 120 are parallel to each other.

Based on the above, in the illumination system 100E according to this embodiment of the disclosure, since the first reflector 140F is the optical film, the volume of the illumination system 100E may be further reduced.

Figure 8:
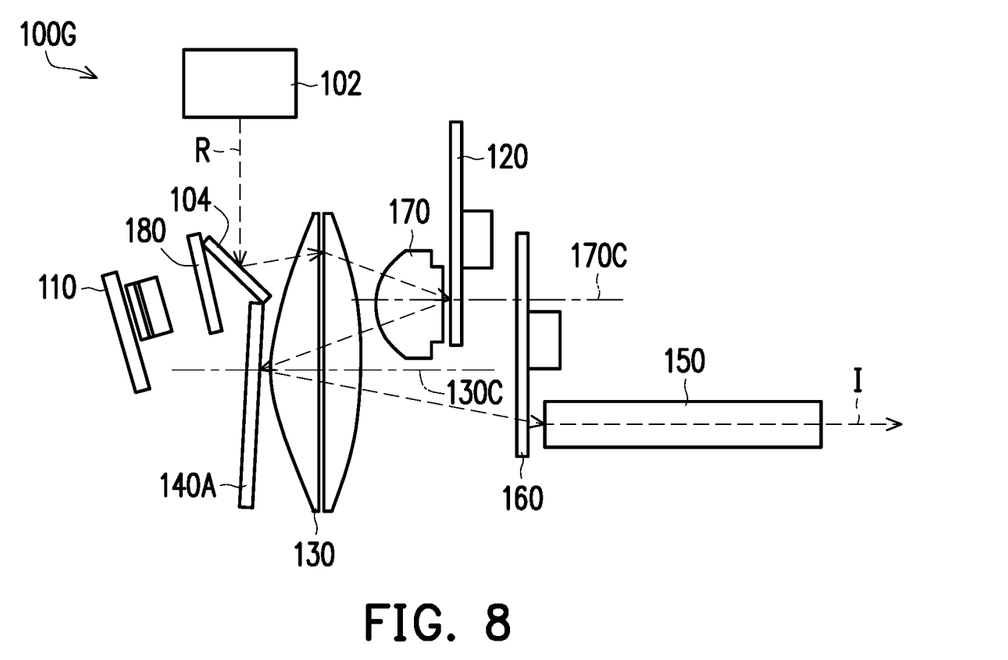
FIG. 8 is a schematic diagram of an illumination system according to an eighth embodiment of the disclosure.

FIG. 8 is a schematic diagram of an illumination system according to an eighth embodiment of the disclosure. Referring to FIG. 8, an illumination system 100G according to this embodiment is similar to the illumination system 100C of FIG. 4. The main difference is that the illumination system 100G further includes an auxiliary light source 102 and a beam splitter 104. The auxiliary light source 102 is configured to emit a third color light R. The auxiliary light source 102 is, for example, a laser diode or other suitable light source, and the third color light R is, for example, red light or other beams with different light color from the excitation beam B. In addition, the beam splitter 104 is configured to allow the excitation beam B to pass through and to reflect the third color light R.

In this embodiment, the beam splitter 104 is disposed on transmission paths of the excitation beam B and the third color light R. In the first time sequence or/and the second time sequence, the third color light R from the auxiliary light source 102 is reflected to the first lens 130 by the beam splitter 104, and then is transmitted to the light uniforming element 150 through the same optical path as the excitation beam B in the first time sequence, so that the illumination system 100G outputs the first color light and the third color light in the illumination beam I.

Based on the above, in the embodiment of the disclosure, since the illumination system 100G includes the auxiliary light source 102 that emits the third color light R, the illumination system 100G may output the illumination beam I with a better color gamut, such as an increased brightness or an adjusted color gamut.

Figure 9:
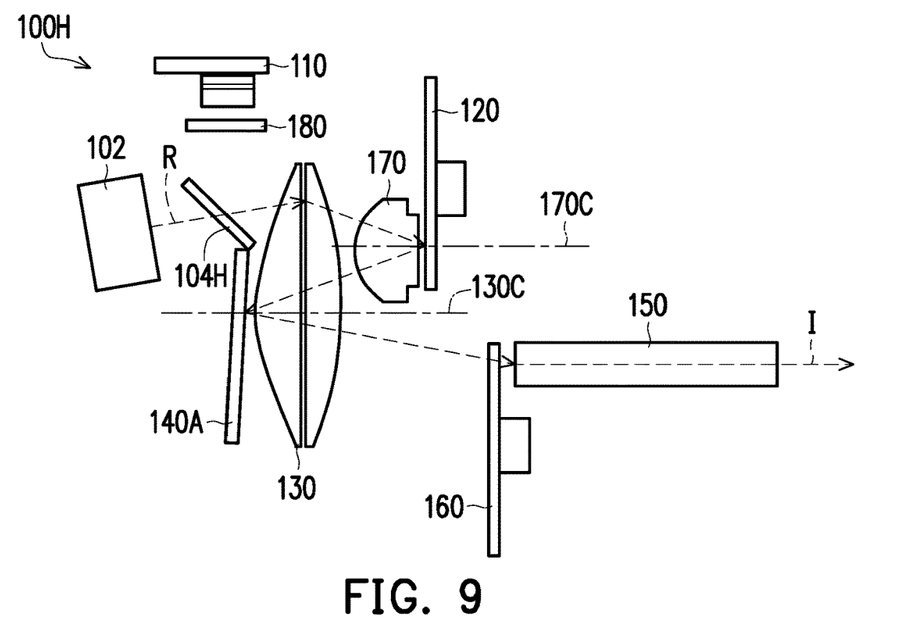
FIG. 9 is a schematic diagram of an illumination system according to a ninth embodiment of the disclosure.

FIG. 9 is a schematic diagram of an illumination system according to a ninth embodiment of the disclosure. Referring to FIG. 9, an illumination system 100H according to this embodiment is similar to the illumination system 100G of FIG. 8. The main difference is that a beam splitter 104H is configured to allow the third color light R to pass through and to reflect the excitation beam B. Furthermore, in the first time sequence or/and the second time sequence, the third color light R from the auxiliary light source 102 passes through the beam splitter 104H and then is transmitted to the first lens 130, and then is transmitted to the light uniforming element 150 through the same optical path as the excitation beam B in the first time sequence. The advantages of the illumination system 100H according to this embodiment of the disclosure are similar to the illumination system 100G of FIG. 8, which will not be repetitively described in the following.

Figure 10:
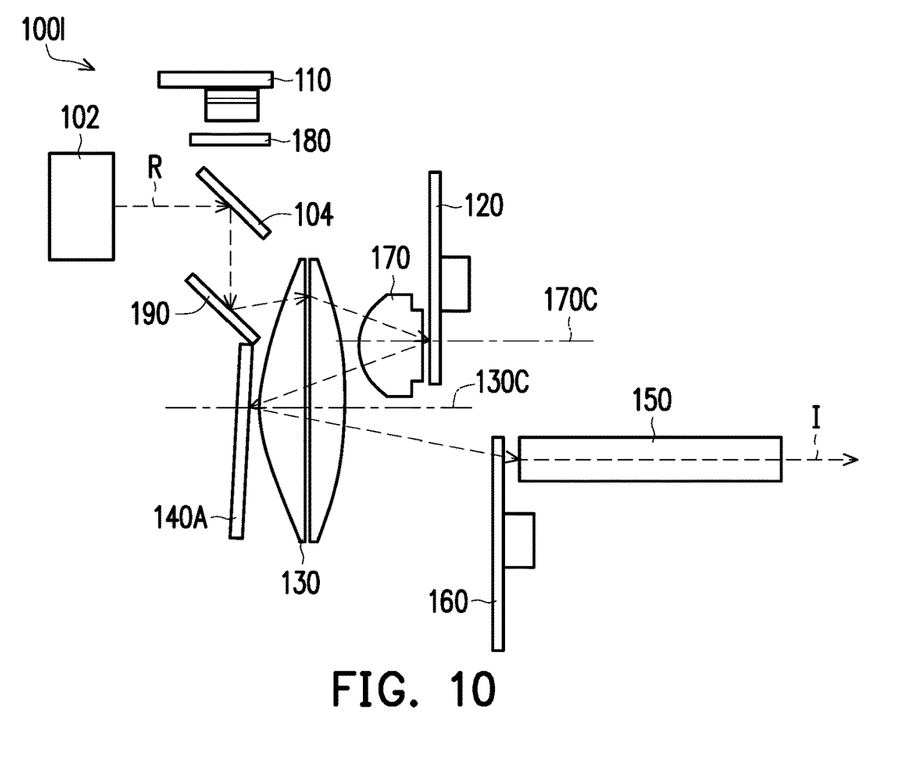
FIG. 10 is a schematic diagram of an illumination system according to a tenth embodiment of the disclosure.

FIG. 10 is a schematic diagram of an illumination system according to a tenth embodiment of the disclosure. Referring to FIG. 10, an illumination system 100I according to this embodiment is similar to the illumination system 100G of FIG. 8. The main difference is that the illumination system 100I further includes the second reflector 190. The second reflector 190 reflects the excitation beam B passing through the beam splitter 104 and the third color light R reflected by the beam splitter 104 to the first lens 130. Furthermore, in the first time sequence or/and the second time sequence, the third color light R from the auxiliary light source 102 is reflected by the second reflector 190 and then is transmitted to the first lens 130, and then is transmitted to the light uniforming element 150 through the same optical path as the excitation beam B in the first time sequence. The advantages of the illumination system 100I according to this embodiment of the disclosure are similar to the illumination system 100G of FIG. 8, which will not be repetitively described in the following.

In summary, in one embodiment of the disclosure, the optical path of the illumination system or the projection apparatus is designed as the following. Since an excitation beam passes through a first lens three times and then is transmitted to a light uniforming element, a conversion beam passes through the first lens twice and then is transmitted to the light uniforming element, and the excitation beam and the conversion beam share a common optical path after leaving a phosphor wheel, the overall optical path of the illumination system is relatively simple, and the accumulated tolerance of structure is reduced. Therefore, the assembly of the system may be facilitated, the accuracy of assembly may be improved, and the volume may be further reduced. In addition, the terms "first", "second", and similar terms mentioned throughout the whole specification of the present application (including the appended claims) are merely used to name discrete elements or to differentiate among different embodiments or ranges, instead of limiting an upper bound or lower bound of the number of elements or the sequence of elements.

The aforementioned description of the preferred of the disclosure has been presented for purposes of illustration and description. It is not intended to be exhaustive or to limit the disclosure to the precise form or to exemplary embodiments disclosed. Accordingly, the aforementioned description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An illumination system for providing an illumination beam, comprising an exciting light source, a phosphor wheel, a first lens, a first reflector, and a light uniforming element, wherein:
   the exciting light source is configured to emit an excitation beam, and the excitation beam passes through the first lens and then is transmitted to the phosphor wheel, wherein the first reflector is disposed on an optical axis of the first lens, and the first reflector is not disposed on a transmission path of the excitation beam from the exciting light source to the first lens;
   in a first time sequence, the phosphor wheel is configured to reflect the excitation beam to the first reflector, the first reflector reflects the excitation beam to the first lens and the excitation beam passes through the first lens and then transmits to the light uniforming element; and
   in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element,
   wherein the excitation beam from the phosphor wheel and the conversion beam from the phosphor wheel, in the first time sequence and in the second time sequence, are respectively transmitted to the light uniforming element to generate the illumination beam.

2. The illumination system according to claim 1, wherein the first reflector is parallel to the phosphor wheel.

3. The illumination system according to claim 1, wherein the first reflector and the phosphor wheel are not parallel to each other.

4. The illumination system according to claim 1, further comprising a second reflector disposed on the transmission path of the excitation beam, wherein the excitation beam from the exciting light source is reflected by the second reflector to the first lens.

5. The illumination system according to claim 1, further comprising a color filter wheel disposed between the first lens and the light uniforming element, wherein the excitation beam and the conversion beam passing through the first lens pass through the color filter wheel and then are transmitted to the light uniforming element.

6. The illumination system according to claim 1, wherein the first reflector comprises a light splitting region and a reflecting region, wherein
   the excitation beam from the exciting light source passes through the light splitting region and then is transmitted to the first lens;

in the first time sequence, the excitation beam passing through the first lens is reflected to the first lens by the reflecting region; and in the second time sequence, the conversion beam passing through the first lens is reflected to the first lens by the light splitting region or the reflecting region.

7. The illumination system according to claim 6, wherein the first reflector and the first lens are parallel to each other.

8. The illumination system according to claim 6, wherein the first reflector and the first lens are not parallel to each other.

9. The illumination system according to claim 6, wherein the first reflector is an optical film disposed on a surface of the first lens away from the phosphor wheel.

10. The illumination system according to claim 1, further comprising an auxiliary light source and a beam splitter, wherein the auxiliary light source is configured to emit a third color light, and the beam splitter is disposed on the transmission path of the excitation beam and a transmission path of the third color light, wherein the excitation beam from the exciting light source and the third color light from the auxiliary light source are transmitted to the first lens after respectively passing through the beam splitter and being reflected by the beam splitter or being reflected by the beam splitter and passing through the beam splitter, and then are transmitted to the light uniforming element though a same optical path of the excitation beam in the first time sequence, such that the illumination system outputs a first color light and a third color light in the illumination beam.

11. An illumination system for providing an illumination beam, comprising an exciting light source, a phosphor wheel, a first lens, a first reflector, a color filter wheel and a light uniforming element, wherein:

the exciting light source is configured to emit an excitation beam, and the excitation beam passes through the first lens and then is transmitted to the phosphor wheel;

in a first time sequence, the phosphor wheel is configured to reflect the excitation beam to the first reflector, the first reflector reflects the excitation beam to the first lens and the excitation beam passes through the first lens and then transmits to the light uniforming element; and in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element, wherein the excitation beam from the phosphor wheel and the conversion beam from the phosphor wheel, in the first time sequence and in the second time sequence, are respectively transmitted to the light uniforming element to generate the illumination beam, wherein the color filter wheel is disposed between the first lens and the light uniforming element, wherein the excitation beam and the conversion beam passing through the first lens pass through the color filter wheel and then are transmitted to the light uniforming element, wherein along an optical axis direction of the first lens, the phosphor wheel partially overlaps the color filter wheel.

12. An illumination system for providing an illumination beam, comprising an exciting light source, a phosphor wheel, a first lens, a first reflector, a second lens and a light uniforming element, wherein:

the exciting light source is configured to emit an excitation beam, and the excitation beam passes through the first lens and then is transmitted to the phosphor wheel;

in a first time sequence, the phosphor wheel is configured to reflect the excitation beam to the first reflector, the first reflector reflects the excitation beam to the first lens and the excitation beam passes through the first lens and then transmits to the light uniforming element; and in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element, wherein the excitation beam from the phosphor wheel and the conversion beam from the phosphor wheel, in the first time sequence and in the second time sequence, are respectively transmitted to the light uniforming element to generate the illumination beam, wherein the first reflector comprises a light splitting region and a reflecting region, wherein the excitation beam from the exciting light source passes through the light splitting region and then is transmitted to the first lens;

in the first time sequence, the excitation beam passing through the first lens is reflected to the first lens by the reflecting region; and in the second time sequence, the conversion beam passing through the first lens is reflected to the first lens by the light splitting region or the reflecting region, wherein the second lens is disposed between the first lens and the phosphor wheel, wherein an optical axis of the first lens and an optical axis of the second lens are not parallel to each other.

13. A projection apparatus, comprising an illumination system, a light valve and a projection lens, wherein the illumination system is configured to provide an illumination beam, the light valve is disposed on a transmission path of the illumination beam to convert the illumination beam into an image beam, and the projection lens is disposed on a transmission path of the image beam to project the image beam out of the projection apparatus, the illumination system comprising an exciting light source, a phosphor wheel, a first lens, a first reflector, and a light uniforming element, wherein:

the exciting light source is configured to emit an excitation beam, and the excitation beam passes through the first lens and then is transmitted to the phosphor wheel, wherein the first reflector is disposed on an optical axis of the first lens, and the first reflector is not disposed on a transmission path of the excitation beam from the exciting light source to the first lens;

in a first time sequence, the phosphor wheel is configured to reflect the excitation beam to the first reflector, the first reflector reflects the excitation beam to the first lens and the excitation beam passes through the first lens and then transmits to the light uniforming element; and in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element, wherein the excitation beam from the phosphor wheel and the conversion beam from the phosphor wheel, in the first time sequence and in the second time sequence, are respectively transmitted to the light uniforming element to generate the illumination beam.

14. The projection apparatus according to claim 13, wherein the first reflector is parallel to the phosphor wheel.

15. The projection apparatus according to claim 13, wherein the first reflector and the phosphor wheel are not parallel to each other.

16. The projection apparatus according to claim 13, further comprising a second reflector disposed on the transmission path of the excitation beam, wherein the excitation beam from the exciting light source is reflected by the second reflector to the first lens.

17. The projection apparatus according to claim 13, further comprising a color filter wheel disposed between the first lens and the light uniforming element, wherein the excitation beam and the conversion beam passing through the first lens pass through the color filter wheel and then are transmitted to the light uniforming element.

18. The projection apparatus according to claim 13, wherein the first reflector comprises a light splitting region and a reflecting region, wherein
the excitation beam from the exciting light source passes through the light splitting region and then is transmitted to the first lens;
in the first time sequence, the excitation beam passing through the first lens is reflected to the first lens by the reflecting region; and
in the second time sequence, the conversion beam passing through the first lens is reflected to the first lens by the light splitting region or the reflecting region.

19. The projection apparatus according to claim 18, wherein the first reflector and the first lens are parallel to each other.

20. The projection apparatus according to claim 18, wherein the first reflector and the first lens are not parallel to each other.

21. The projection apparatus according to claim 18, wherein the first reflector is an optical film disposed on a surface of the first lens away from the phosphor wheel.

22. The projection apparatus according to claim 13, further comprising an auxiliary light source and a beam splitter, wherein the auxiliary light source is configured to emit a third color light, and the beam splitter is disposed on the transmission path of the excitation beam and a transmission path of the third color light, wherein
the excitation beam from the exciting light source and the third color light from the auxiliary light source are transmitted to the first lens after respectively passing through the beam splitter and being reflected by the beam splitter or being reflected by the beam splitter and passing through the beam splitter, and then are transmitted to the light uniforming element though a same optical path of the excitation beam in the first time sequence, such that the illumination system outputs a first color light and the third color light in the illumination beam.

23. A projection apparatus, comprising an illumination system, a light valve and a projection lens, wherein the illumination system is configured to provide an illumination beam, the light valve is disposed on a transmission path of the illumination beam to convert the illumination beam into an image beam, and the projection lens is disposed on a transmission path of the image beam to project the image beam out of the projection apparatus,
the illumination system comprising an exciting light source, a phosphor wheel, a first lens, a first reflector, a color filter wheel and a light uniforming element, wherein:
the exciting light source is configured to emit an excitation beam, and the excitation beam passes through the first lens and then is transmitted to the phosphor wheel;
in a first time sequence, the phosphor wheel is configured to reflect the excitation beam to the first reflector, the first reflector reflects the excitation beam to the first lens and the excitation beam passes through the first lens and then transmits to the light uniforming element; and
in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element,
wherein the excitation beam from the phosphor wheel and the conversion beam from the phosphor wheel, in the first time sequence and in the second time sequence, are respectively transmitted to the light uniforming element to generate the illumination beam,
wherein the color filter wheel is disposed between the first lens and the light uniforming element, wherein the excitation beam and the conversion beam passing through the first lens pass through the color filter wheel and then are transmitted to the light uniforming element,
wherein along an optical axis direction of the first lens, the phosphor wheel partially overlaps the color filter wheel.

24. A projection apparatus, comprising an illumination system, a light valve and a projection lens, wherein the illumination system is configured to provide an illumination beam, the light valve is disposed on a transmission path of the illumination beam to convert the illumination beam into an image beam, and the projection lens is disposed on a transmission path of the image beam to project the image beam out of the projection apparatus,
the illumination system comprising an exciting light source, a phosphor wheel, a first lens, a first reflector, a second lens and a light uniforming element, wherein:
the exciting light source is configured to emit an excitation beam, and the excitation beam passes through the first lens and then is transmitted to the phosphor wheel;
in a first time sequence, the phosphor wheel is configured to reflect the excitation beam to the first reflector, the first reflector reflects the excitation beam to the first lens and the excitation beam passes through the first lens and then transmits to the light uniforming element; and
in a second time sequence, the phosphor wheel is configured to convert the excitation beam to a conversion beam, the conversion beam emitted from the phosphor wheel passes the first lens and then transmits to the first reflector, the first reflector reflects the conversion beam to the first lens, the conversion beam passes through the first lens and then transmits to the light uniforming element, wherein the excitation beam from the phosphor wheel and the conversion beam from the phosphor wheel, in the first time sequence and in the second time sequence, are respectively transmitted to the light uniforming element to generate the illumination beam, wherein the first reflector comprises a light splitting region and a reflecting region, wherein
- the excitation beam from the exciting light source passes through the light splitting region and then is transmitted to the first lens;
- in the first time sequence, the excitation beam passing through the first lens is reflected to the first lens by the reflecting region; and
- in the second time sequence, the conversion beam passing through the first lens is reflected to the first lens by the light splitting region or the reflecting region, wherein the second lens is disposed between the first lens and the phosphor wheel, wherein an optical axis of the first lens and an optical axis of the second lens are not parallel to each other.

* * * * *